United States Patent
Yarin et al.

(10) Patent No.: US 12,440,300 B2
(45) Date of Patent: Oct. 14, 2025

(54) DEDICATED FORM FOR USE WITH CORRESPONDING ELECTROANATOMICAL MAPS

(71) Applicant: BIOSENSE WEBSTER (ISRAEL) LTD., Yokneam (IL)

(72) Inventors: Inna Yarin, Yoqneam Elit (IL); Talia Alon, Nesher (IL); Deborah Brezner, Katzir (IL); Emuna Eliav, Pardes Hana (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 117 days.

(21) Appl. No.: 17/895,620

(22) Filed: Aug. 25, 2022

(65) Prior Publication Data
US 2024/0065801 A1 Feb. 29, 2024

(51) Int. Cl.
A61B 90/00 (2016.01)
A61B 5/339 (2021.01)
G06F 3/04847 (2022.01)

(52) U.S. Cl.
CPC .......... A61B 90/37 (2016.02); G06F 3/04847 (2013.01); A61B 5/339 (2021.01)

(58) Field of Classification Search
None
See application file for complete search history.

(56) References Cited

U.S. PATENT DOCUMENTS

| | | | |
|---|---|---|---|
| 5,442,788 A | 8/1995 | Bier | |
| 6,580,442 B1* | 6/2003 | Singh | G06F 3/0482 345/173 |
| 9,980,703 B2 | 5/2018 | Wodecki | |
| 2004/0021647 A1 | 2/2004 | Iwema | |
| 2005/0165912 A1 | 7/2005 | Colbeck | |
| 2006/0061595 A1* | 3/2006 | Goede | G06F 16/51 707/E17.031 |
| 2006/0143093 A1 | 6/2006 | Brandt | |
| 2010/0064252 A1* | 3/2010 | Kramer | G06F 40/174 715/810 |
| 2012/0110019 A1* | 5/2012 | Nielsen | G06Q 50/26 707/781 |
| 2013/0131496 A1* | 5/2013 | Jenkins | A61B 5/283 600/411 |
| 2015/0074516 A1 | 3/2015 | Ben-Aharon | |

(Continued)

FOREIGN PATENT DOCUMENTS

EP 951789 A2 10/1999
WO WO2018130976 A1 7/2018

OTHER PUBLICATIONS

"Collapsible Sections", Inclusive Components, 2017 (Year: 2017).*

(Continued)

*Primary Examiner* — Gabriel Mercado
(74) *Attorney, Agent, or Firm* — Gabriel K. Azar

(57) ABSTRACT

The disclosed methods and systems provide for working with the ever-increasing features of electroanatomical maps, displayed for use in various medical procedures. The features are represented, for example, as "map layers" or "layers" (these terms used interchangeably herein), and allow the operator of the electroanatomical mapping system to define and control all of the layers of the electroanatomical map being displayed from a single form.

17 Claims, 9 Drawing Sheets

(56) References Cited

U.S. PATENT DOCUMENTS

| | | |
|---|---|---|
| 2017/0039030 A1 | 2/2017 | Ikeda |
| 2017/0281031 A1* | 10/2017 | Houben ............. A61B 18/1492 |
| 2018/0260258 A1 | 9/2018 | Wester |
| 2018/0310987 A1 | 11/2018 | Altmann |
| 2018/0356964 A1 | 12/2018 | Morris |
| 2020/0110792 A1* | 4/2020 | Tsabba ................... G06F 3/167 |
| 2020/0245017 A1* | 7/2020 | Ganschow ......... H04N 21/4312 |
| 2020/0350056 A1 | 11/2020 | Handal |
| 2022/0360639 A1* | 11/2022 | McCall ................ H04L 67/306 |

OTHER PUBLICATIONS

Inclusive Components, Non-Patent Literature, "Collapsible Sections" (2017) (Year: 2017).*

International Search Report for corresponding PCT Appln. No. PCT/IB2023/058341 dated Oct. 27, 2023.

\* cited by examiner

DEDICATED FORM FOR USE WITH CORRESPONDING ELECTROANATOMICAL MAPS

TECHNICAL FIELD

The present disclosure is directed to electroanatomical maps, and particularly, to the display of map information during a time when the electroanatomical map is displayed.

BACKGROUND

Electroanatomical mapping of organs, such as the heart and cardiac tissues and vessels, continues to achieve higher resolutions, showing multiple aspects of the organ in greater detail. With this increased resolution comes increased demand on the operator of the mapping system, as the higher resolution gives rise to increasing numbers of features for the electroanatomical map, with greater complexities, which require additional operator attention and control thereof.

For example, during a procedure, such as a CARTO® procedure, using an electroanatomical map, such as a CARTO® map produced by a CARTO® system (the CARTO® map, system and procedure available from Biosense Webster, Inc., 31A Technology Drive, Irvine, CA 92618, the applicant and assignee of this patent application), a system operator defines layers of the electroanatomical map by accessing multiple forms and/or menus. Each form or menu is dedicated to a particular layer type. These layer types include, for example, Coherence layers, Cartofinder markings, and tag types, all of which use separate forms.

SUMMARY

The disclosed methods and systems provide for working with the ever-increasing features of electroanatomical maps, which are used in various medical procedures. The features are represented, for example, as "map layers" or "layers" (these terms used interchangeably herein), and allow the operator of the electroanatomical mapping system to define and control all of the layers of the electroanatomical map being displayed from a single form. This single form serves as a single location, as presented on a display, from which all layers of the displayed electroanatomical map can be managed, thus, simplifying the navigation needed by the operator, as well as reducing the time needed for setting up specific electroanatomical maps.

The disclosed system combines all of the elements of several different, and previously, only separately available, forms and/or menus into a single form, which is dedicated to layers management. The single form is such that it is accessible by a single dedicated button on a display screen, monitor, or the like. Alternatively, a minimized window of unique icons with tool tips may be presented on the screen. The single form is collapsible such that only titles of the different sections (the sections, for example, corresponding to subforms) are visible.

Each layer of the map is represented as a corresponding layer on the single form. Throughout this document, "layer" on the form is also referred to as a "form layer", with these terms used interchangeably herein. The form layer on the single form is easily shown or hidden upon the electroanatomical map, through a single mouse click or other activation on a button with layer's unique icon, either from the full or minimized form. In the full form, each layer includes its settings that can be set in advance, even if the layer itself is currently hidden from the map.

In addition, each layer's button can be right clicked to easily lead the user to the preferences form, related to this layer (e.g., tag and type form, scar preferences form).

BRIEF DESCRIPTION OF THE DRAWINGS

The present disclosure will be more fully understood from the following detailed description below with reference to figures attached hereto. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

Attention is now directed to the drawings in which:

FIG. 2B-1 shows the form of FIG. 2A with the "All Tags" layers collapsed;

FIG. 2B-2 shows the form of FIG. 2A with a subform having its layers expanded;

FIGS. 3A and 3B-1 are electroanatomical maps with activatable elements added thereto in order to display the form of FIG. 2A on the respective electroanatomical map;

FIG. 3B-2 is a detailed view of the display box of FIG. 3B-1;

DETAILED DESCRIPTION OF EXAMPLES

Overview

Figure 1:
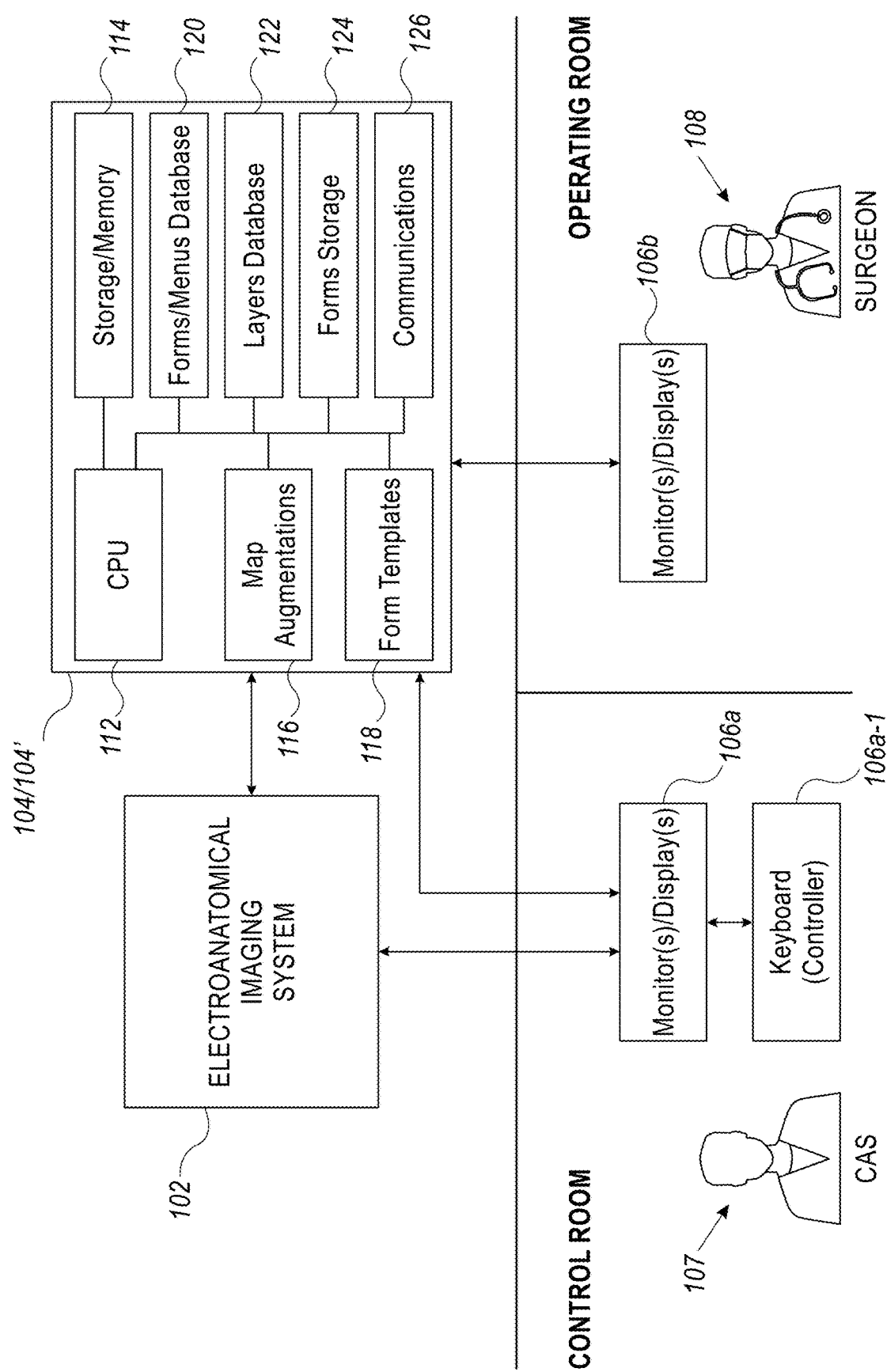
FIG. 1 is an illustration of an example environment, including a system, showing the disclosed subject matter.

Throughout this document, references are made to directions and/or orientations such as, including but not limited to, right, left, up, down, upward, downward and derivatives thereof. These directions and/or orientations are exemplary only, used in explaining the disclosed subject matter.

Various surgical procedures involve displaying information to the surgeon on one or more monitors in the operating room. For example, some cardiac mapping procedures are performed to acquire, analyze, and display electroanatomical maps of the human heart, and provide real-time displays of catheter position superimposed on the 3D cardiac maps constructed. The three dimensional (3D) maps created are reconstructions based on the sampled point data during a procedure. As the points are added to the map, that particular mapped area is displayed on one or more display screens or monitors.

An example electroanatomical map, suitable for use with the disclosed subject matter, for example, includes a CARTO® map. The CARTO® map is produced by and displayed on a CARTO® system.

The present disclosed subject matter is such that all layers management in a procedure using electroanatomical maps, for example, a CARTO® map produced by a CARTO® system, can be operated from a single (one) display location, which is a single dedicated form on a display screen, monitor, or the like. The dedicated form is easily accessible, through a quick access button, which is added to the electroanatomical map by the system and is linked to the now-created dedicated form.

The form includes subforms or sections, based on previous or stored forms), with each subform including layers (also known as form layers). Each subform or section is merged or otherwise integrated into the single form of the disclosed subject matter. Each layer of each section or subform, has a corresponding layer on a corresponding and otherwise associated (and, for example, electronically linked) electroanatomical map.

Each electroanatomical map layer is representative of a characteristic and/or aspect of the electroanatomical map being displayed. Each or some of the layers on the form can be shown/hidden by a single mouse click, touch, swipe, or the like, through a dedicated button with a unique layer icon. The created single form may be divided into collapsible sections, grouped by topics for particular layer types. This allows the user to easily reduce the form's length as desired, so as not to hide or obscure portions of the electroanatomical map.

For example, layers that contain multiple definitions can be easily collapsed to reduce the size of the form. The form can be minimized to present only unique buttons of a layer, to show/hide the layer on the electroanatomical map. Additionally, the form can be pinned to a certain location on the display screen to provide control of the layers without hiding the map itself. The ability to control the settings of the layers, whether the certain layer is currently shown on the map or not, provides the operator (e.g., user) with the ability to configure settings for each respective layer in advance, for example, prior to the actual procedure using the electroanatomical map, without the need to present the layer.

As to the form created in accordance with the present disclosure, the form is configurable by the operator, e.g., the user, that will be able to define the order of the sections and layers, to add and/or remove sections and layers from the form and change their order inside the form. The operator has the capability to save settings of the form into the template, as well as the capability to restore the form to its default settings. The form can be quickly accessed from any possible menu or viewer in the system. The operator can control the dimensions of the form.

The single form is composed of user selected features, and is dedicated to layers management. The form is such, that when activated, it displays on or in close proximity to the electroanatomical map (for example, pinned to the displayed electroanatomical map on the display), so that the operator can see and interact with all of the features and sub-features of the presently displayed electroanatomical map.

The disclosed subject matter eliminates the need for the system operator to remember where various settings are located in each of the individual forms, and thus, eliminates the need for the operator to navigate amongst multiple separate individual forms to locate and adjust the intended setting, while at the same time, having to define the required setting for each electroanatomical map displayed and/or to be displayed, during the operating procedure, which added complication to the procedure. Additionally, the aforementioned procedures were inefficient and time consuming, especially when the operator changed settings to view various map layers multiple times during a procedure. These issues are eliminated by the disclosed single form and its operation, with the use of the disclosed single form simplifying the operation of the procedure, and thus, reducing possible human errors.

The disclosed subject matter combines all of the features from different forms and/or menus into a single (one) form, which is dedicated to layers management. This single form is easily accessible, and displays, for example, automatically and instantaneously, when a user activates an activatable location on the electroanatomical map, such as a button, by a mouse click, touch, swipe, or other activation. This allows the operator to control the electroanatomical map during the entire procedure, with all layers management of the electroanatomical map accessible via the corresponding layers of the single form, which is displayed on a display at or proximate to the displayed electroanatomical map.

System Description

FIG. 1 shows an example environment, in which the disclosed subject matter operates. For example, the environment includes an electroanatomical imaging system 102 in communication with a main server 104 or other host computer, hosting a system 104' for performing the disclosed subject matter. The electroanatomical imaging system 102 and server 104 both communicate with display(s)/monitor(s) 106a, 106b, one of the display(s)/monitor(s) 106a (controllable by a keyboard 106a-1 or other controller) in a control room, under the control of a clinical account specialist (CAS) or operator 107, and the other display(s)/monitor(s) 106b in an operating room, viewable by the surgeon 108. The operator 107 controls his display 106a, which results in the presentation on the display 106b in the operating room for the surgeon 108. The electroanatomical imaging system 102, server 104 and the displays 106a, 106b are in communication with each, over direct connections (wired and/or wireless), or over a network, such as the Internet (a wide area network) or a local area network (LAN).

The electroanatomical imaging system 102 produces electroanatomical maps, for example, of various organs and/or regions of the body, for presentation on the respective displays 106a, 106b. For example, the electroanatomical system 102 may be a system, which is used, for example, in a CARTO® procedure, which produces the electroanatomical map, for example, a CARTO® map, in an electronic form for presentation on the respective display 106a, 106b. The electroanatomical map includes, for example, information such as local activation times (LATs), velocity vectors, ablation tags, non-ablation scar tags, and the like, which are "layers" on the electroanatomical map, the "layers" detailed below.

The electroanatomic map is sent in electronic form (e.g., data) from the electroanatomical imaging system 102 to the server 104. The server 104 (e.g., system 104'), augments the electroanatomical map, with an activatable location, such as a graphic user interface (GUI, for example, an activatable button, which is linked (mapped) to a disclosed form. The activated GUI allows for toggling (by a user) on the GUI (button) (for example, by mouse click, swipe, contact, or other activation) on the correspondingly displayed electroanatomical map, such that when the GUI (button) is activated, the form is rendered on the respective display 106a, 106b with the electroanatomical map 300 (which was previously, contemporaneously or simultaneously, being rendered on the respective display 106a, 106b).

The main server 104 is of an architecture which includes one or more components, engines, modules and the like, for providing numerous functions and operations, and, for performing the disclosed processes. The main server 104 may be associated with additional storage, memory, caches and databases, both internal and external thereto.

The architecture of the main server 104, for example, includes a system 104' for performing the disclosed processes of form creation and display. The system 104' includes a central processing unit (CPU) 112 formed of one or more processors, electronically connected, i.e., either directly or indirectly, including in electronic and/or data communication with storage/memory 114, a module for electroanatomical map augmentations 116, a forms templates module 118, a forms/menus database 120, a layers database 122, a completed forms database 124 and, a communications module 126. For example, a "module" includes one or components for storing instructions, (e.g., machine readable instructions) for performing one or more processes, and including or associated with processors, for example, the CPU 112, for executing the instructions.

The aforementioned components 112, 114, 116, 118, 120, 122, 124, and 126 are communication with each other, either directly or indirectly. While the main server 104 is shown as a single server, with all components 112, 114, 116, 118, 120, 122, 124, and 126, therein, the main server 104 may be a plurality of servers. Additionally, one or more of the components the components 112, 114, 116, 118, 120, 122, 124, and 126, may be outside of the main server 104, including along a network or in the cloud.

The Central Processing Unit (CPU) 112 is formed of one or more processors, including microprocessors, for performing the main server 110 functions and operations detailed herein, including accessing electroanatomical images from the electroanatomical imaging system 102 and/or the respective display 106a, 106b, augmenting the map images with activatable graphics, e.g., from the augmentation module 116, and controlling the creation of the form, from multiple forms, menus, graphics and the like, and controlling the communications module 126. The processors are, for example, conventional processors, including hardware processors such as those used in servers, computers, and other computerized devices.

The storage/memory 114 is any conventional storage media. The storage/memory 114 stores machine executable instructions for execution by the CPU 112, to perform the disclosed processes. The processors of the CPU 112 and the storage/memory 114, although shown as a single component for representative purposes, may be multiple components, and may be outside of the main server 104.

The augmentation module 116 includes various graphics, which when placed into an electroanatomical map, are activatable graphics, such as buttons and the like, that when activated, render the form 200 on the respective display 106a, 106b, at or proximate to, the presentation of the corresponding electroanatomical map. The activatable graphics are linked (mapped) to the respective corresponding form, which for example, once created, may be in storage media, e.g., the completed forms database 124, and/or the cloud.

The augmentations, including the buttons, include other graphical user interface (GUI) elements, such as tool tips, icons, widgets, and other activatable GUIs/buttons, such as an activatable button 230, where the created form 200 can be applied to a given number of electroanatomical maps, including, for example, one or more electroanatomical maps. The module 116 also includes computer instructions for selecting the GUI element, installing the GUI element on the map, linking the GUI element on the map to the form, and rendering the form for presentation on the respective display 106a, 106b, typically only the operator display 106a, at or proximate to the presented electroanatomical map.

The forms template module 118 includes multiple templates for creating a single form from multiple forms, menus and/or layers for the forms (also known as form layers), the form layers corresponding to layers on electroanatomical maps. The templates may include predetermined forms already incorporated into the template, depending on the type of electroanatomical map the for is to be used (associated) with and linked thereto. The forms are stored in the forms database 120, while the layers are stored in the layers database 122. Certain forms in the forms database 120 may include required layers, and/or instructions therefor, while the forms may also allow for user added layers.

The forms in the forms database 120 which are subforms for the created single form, include, for example, Tags, Coherent, Cartofinder and Highlights. The stored forms may include predetermined layers and/or layers may be added thereto, when the form 200 is created. The stored layers in the layers database 122 include, for example, Non-ablation tags, ablation tags, scar tags, Point marks, complex tags, associated, for example, with a Tags form, conduction velocity vectors, slow or no conduction zone, associated, for example, with the Coherent form, Site indicators and all ROI (Region of interest) Electrodes, associated, for example, with the Cartofinder form, and late potential, complex, and Acquisition Highlight, associated, for example, with the highlight form.

Completed and/or partially completed forms may be stored, for example, in the storage media 124, which may include one or more databases.

The communications module 126 facilitates communications between the main server 104 and the various computers, servers and the like, over various networks. For example, the communications module 126 facilitates communications with the electroanatomical imaging system 102, the displays 106 and the operator computer 109, over direct wired and/or wireless connections, or over networks, such as the Internet, other WAN or LAN.

Figure 2A:
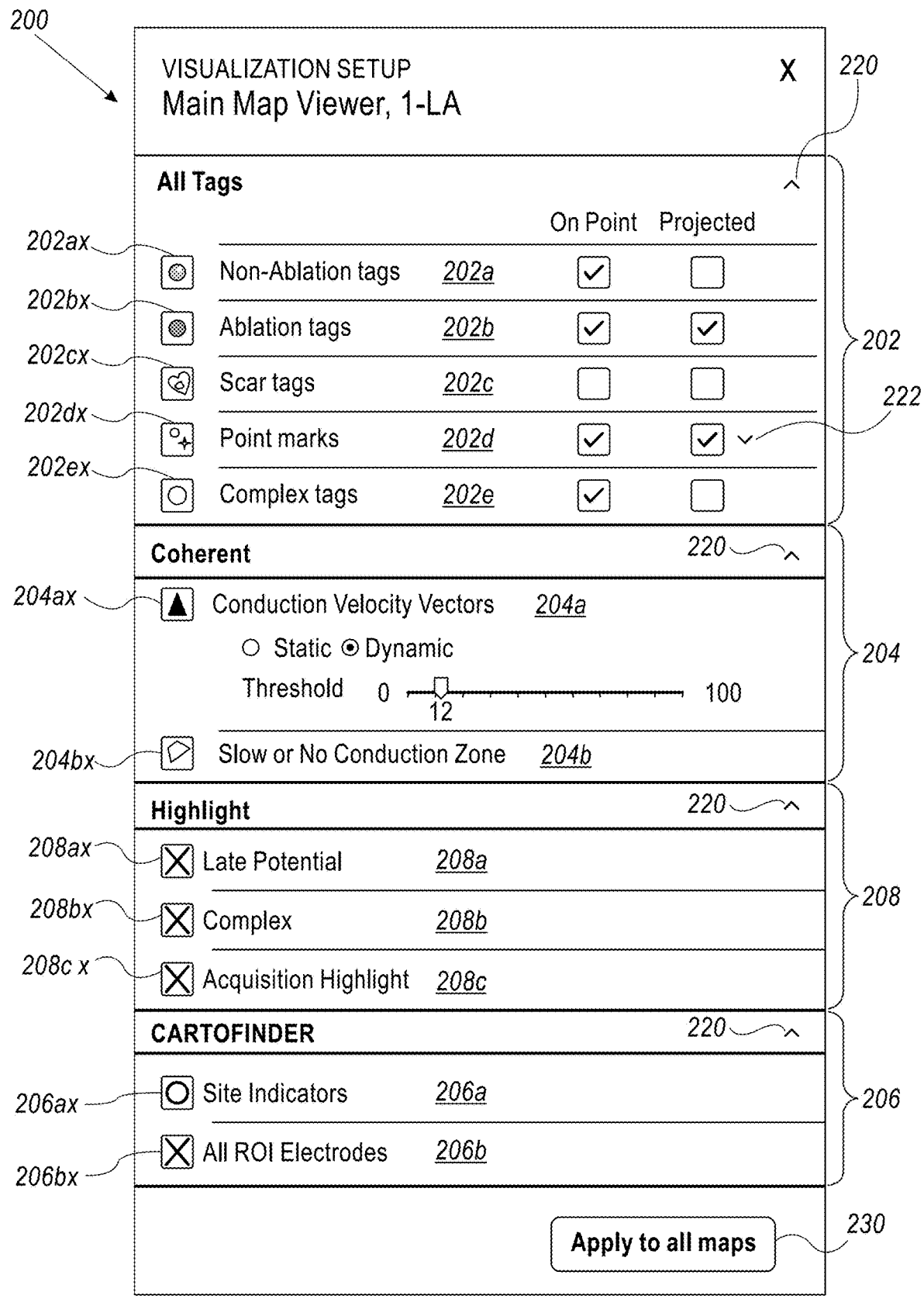
FIG. 2A is an example form created in accordance with the present disclosure.

FIG. 2A shows the form 200 which is presented on the displays 106a, 106b. The form 200 is created by the operator 107, and is created from one or more forms (now subforms within the single form 200), menus and/or layers, so as to be a single (unified or unitary) form 200.

For example, the form 200 is a single and consolidated form, from, for example, a form of tag types 202, a form for coherence layers 204, and a form for Cardiofinder markings 206. These three forms 202, 204, 206, are for example, subforms, which comprise the form 200 are, for example, essential for the operator 107 performing a CARTO® procedure, in order to define specific map layers or sections, such as those for the image 300 of FIGS. 3A, 3B-1, and 4. Accordingly, the form template (from the module 118) is, for example, programmed with the three forms, which are at a minimum, necessary for a CARTO® map of a CARTO® procedure. Additional forms, such as a highlight form 208 may be added to the form, based on the form template selected, when constructing the form 200.

The form 200 is, for example, a single dedicated form for managing an electroanatomical map, as arranged by the operator 107. The operator, for example, has selected a template for the form 200 from the forms template module 118. The operator 107 then selects forms (e.g., functioning as subforms)/menus/sections to be placed into the selected form template, from the forms/menus database 120. Alternately, there may be templates for certain maps, with the minimum necessary forms (e.g., subforms) already preprogrammed in the template.

Alternately, should the selected forms have predetermined layers and allow for additional layers, the additional layers may be selected from layers in the layers database 122. Similarly, if the forms selected lack layers, the layers may be selected from layers in the layers database 122.

The form 200 displays with each form (subform or section) 202, 204, 206, 208, formed of layers 202a-202e (for form 202), 204a, 204b (for form 204), 206a, 206b (for form 206), 208a-208c (for form 208). Each form 202, 204, 206, 208, includes an activatable location (e.g., a button) 220, that when activated (from all layers being expanded, shown by the activatable location 220 as an upward pointing arrow), collapses the layers 202a-202e (for form 202), 204a, 204b (for form 204), 206a, 206b (for form 206), 208a-208c (for form 208), associated with the respective subform 202, 204, 206, 208, and when the respective layers of the respective subform are collapsed (shown by the activatable location 220 as a downward pointing arrow), expands the layers, when the activatable location 220 is activated.

Figures 1, 2B:
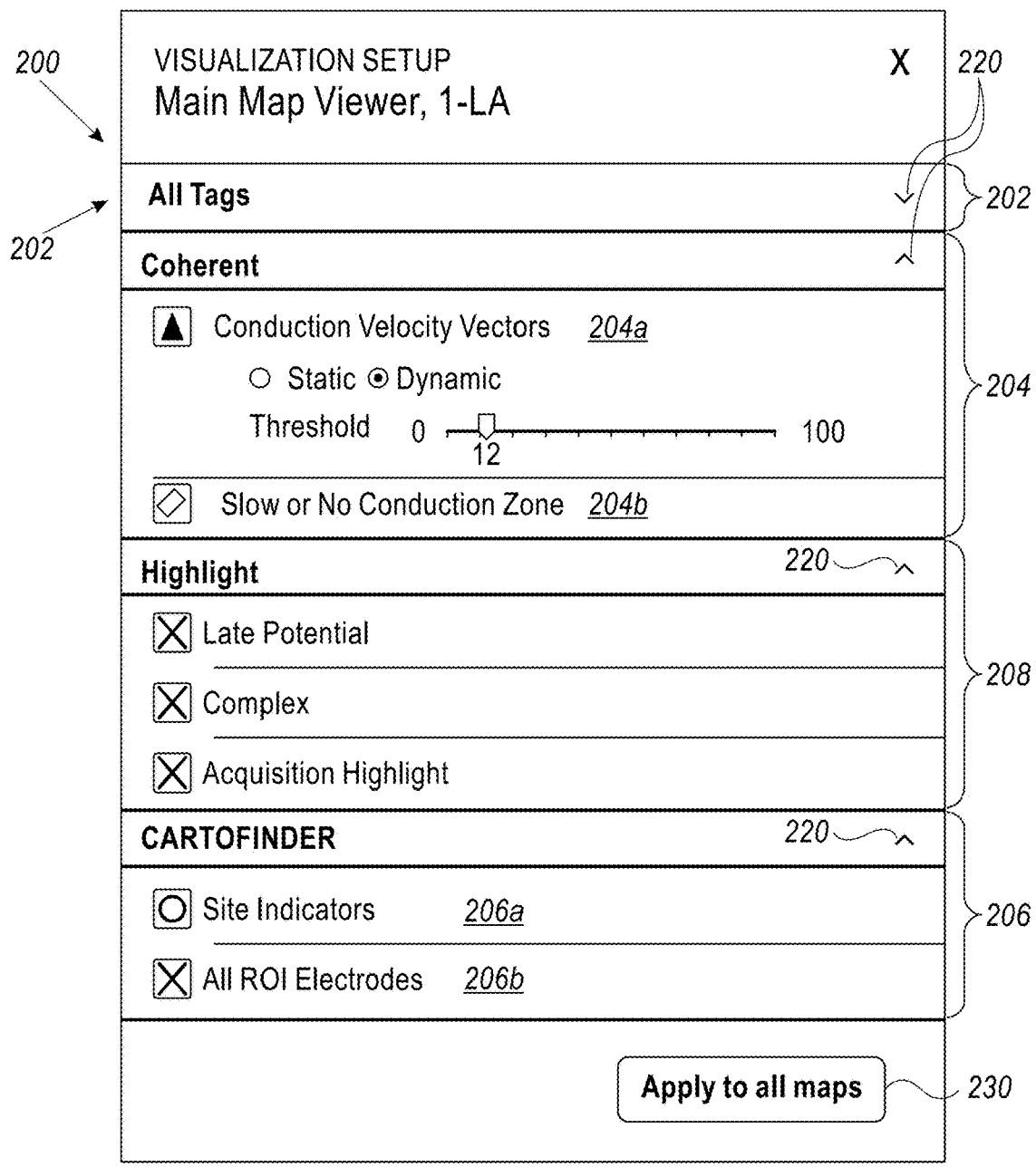

For example, in FIG. 2A the form (subform) "All Tags" 202 is shown in its expanded position, with button 220 an upward pointing arrow. When the button 220 is activated, the form "All Tags" 202 collapses, to the collapsed position, as shown in FIG. 2B-1, where the button 220 for "All Tags" is shown as a downward pointing arrow, indicating a collapsed position for the form 202.

Figures 2, 2B:
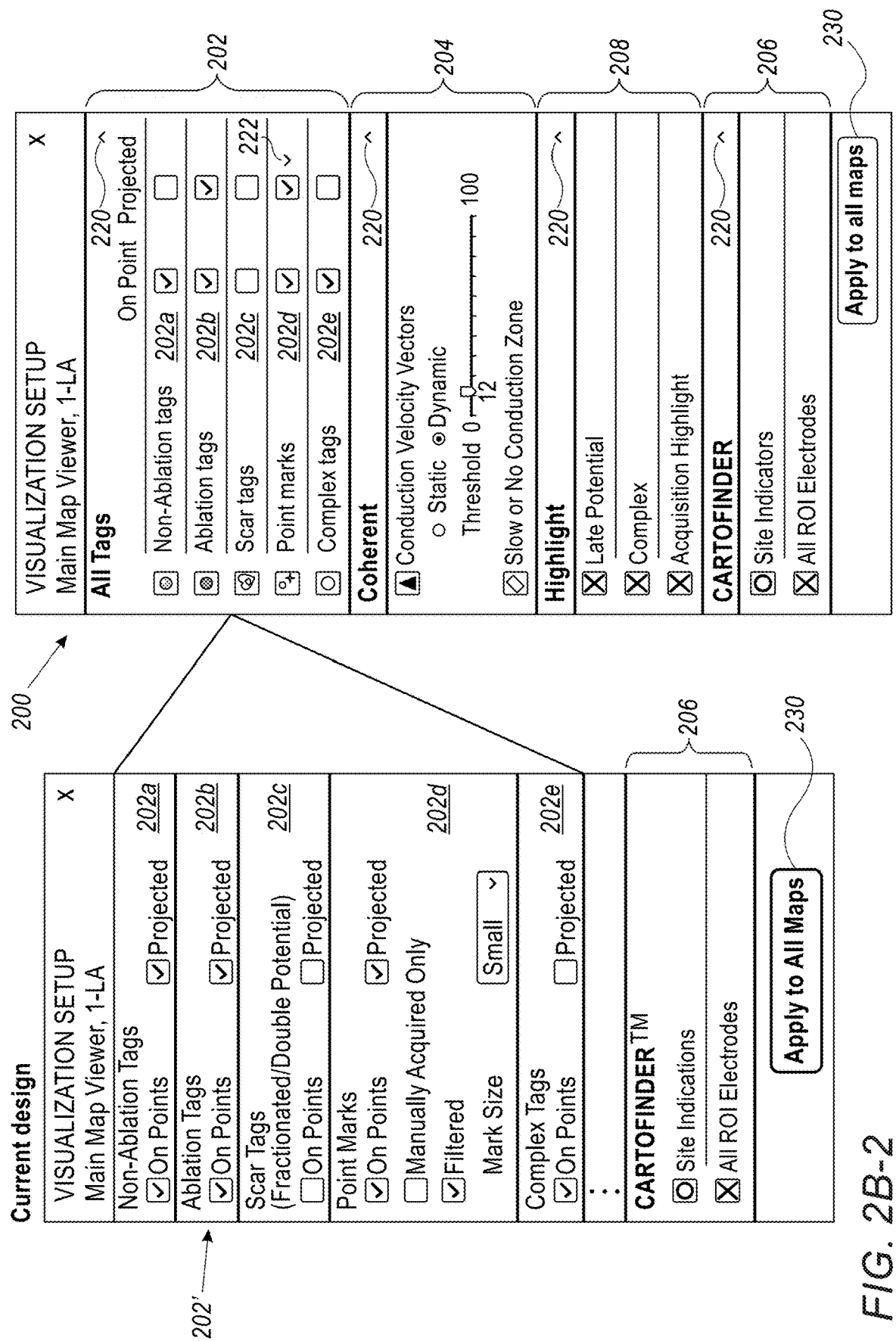
Figures 1, 3B:
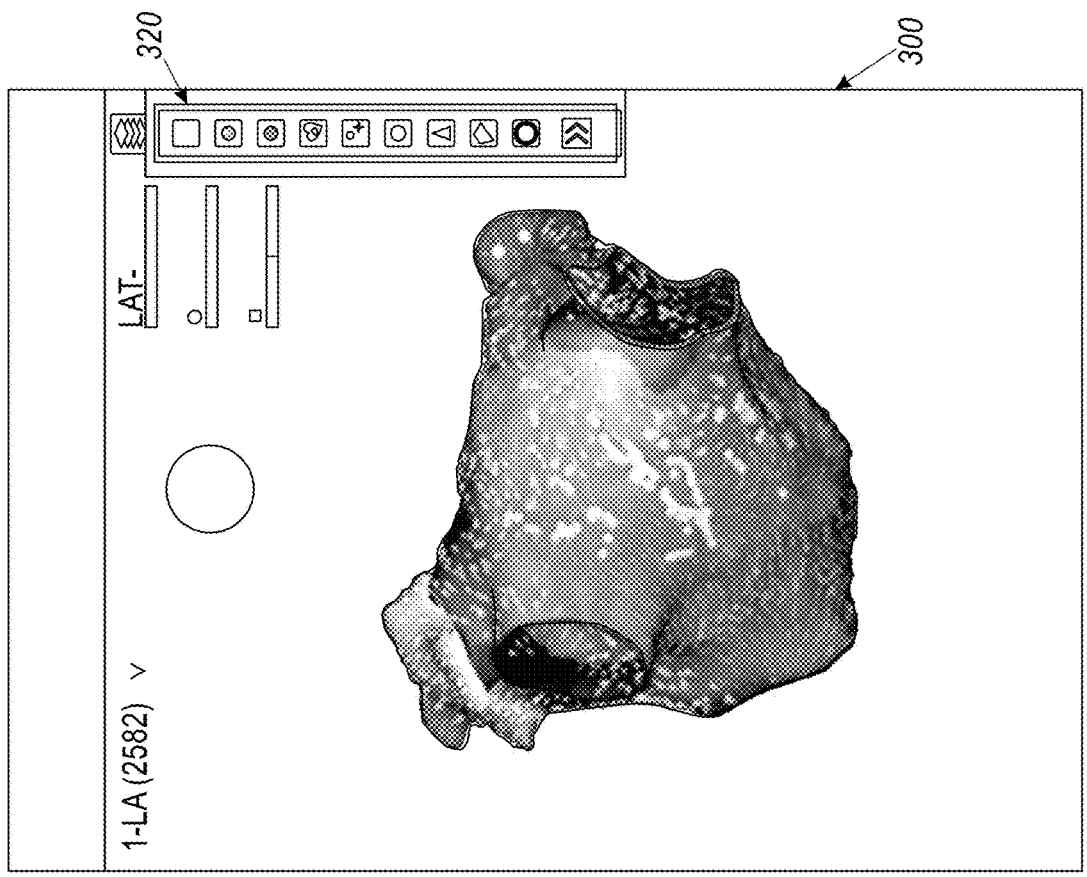
Figure 3A:
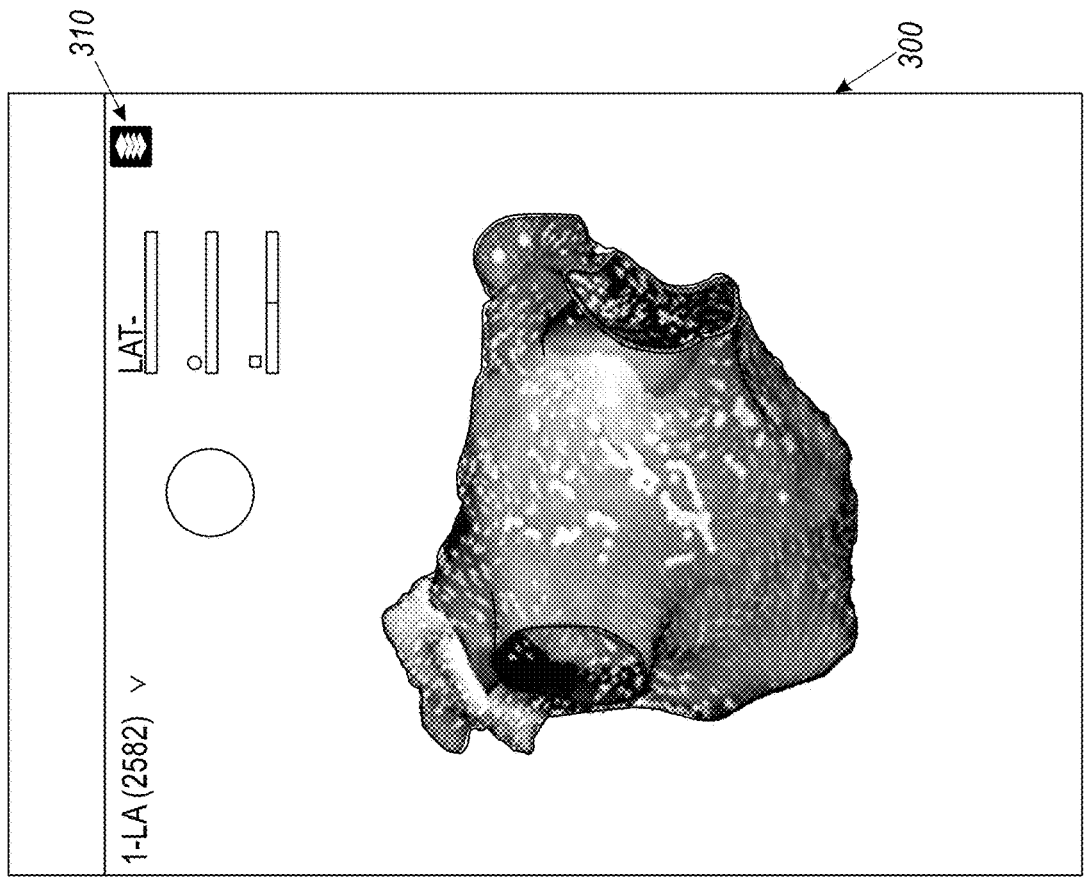
Figures 2, 3B:
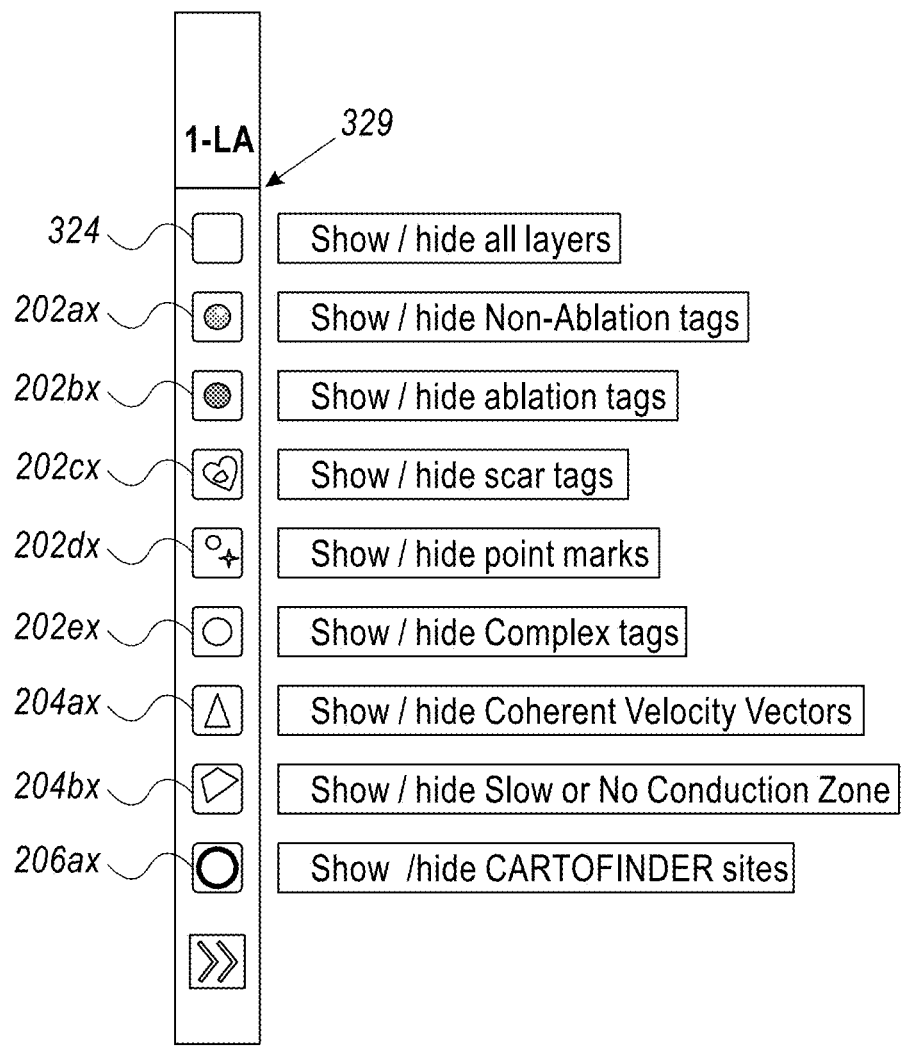
Figure 4:
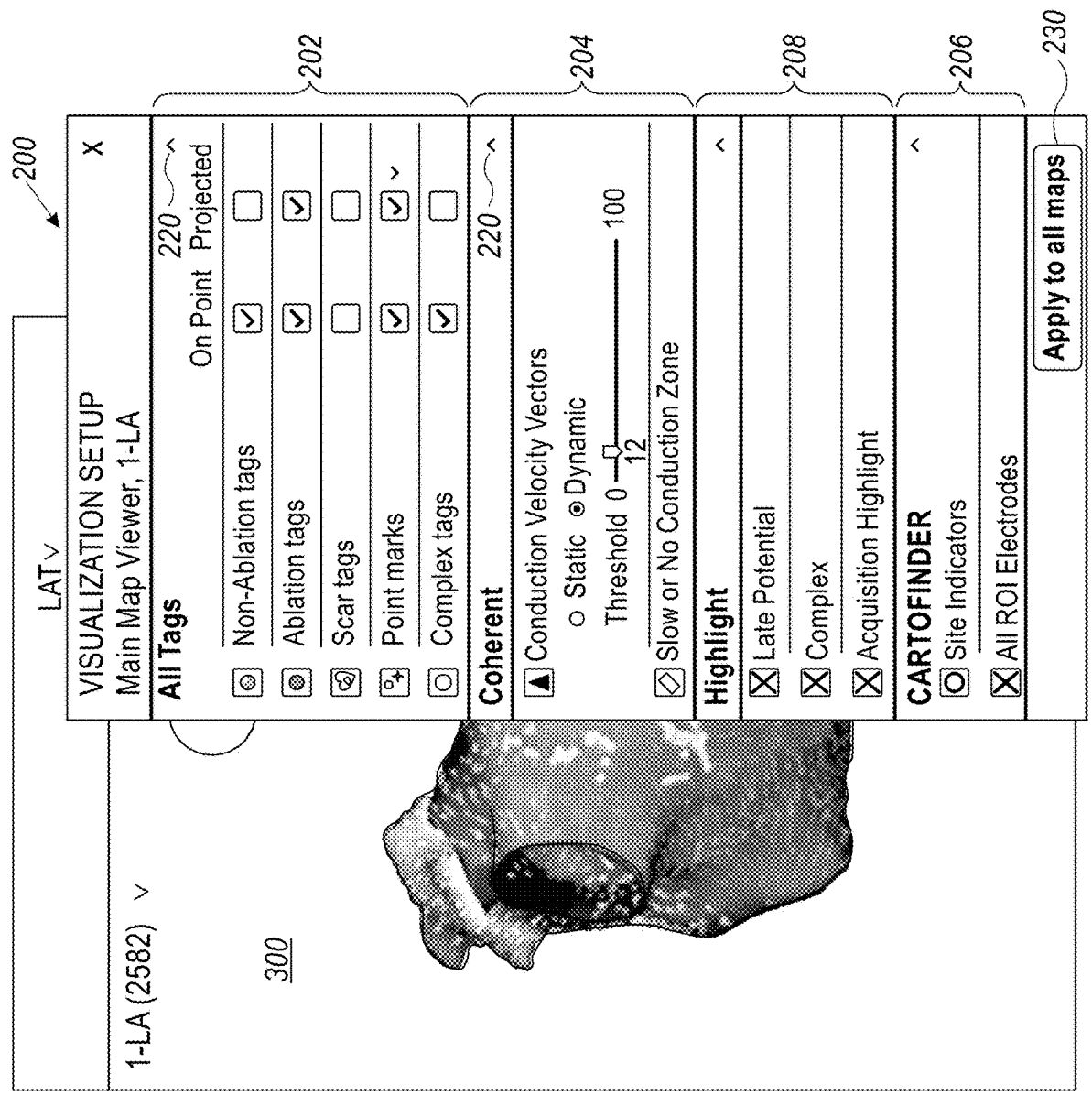
FIG. 4 is the electroanatomical map of FIG. 3A or 3B-1 activated such that the form of FIG. 2A, created in accordance with the present disclosure, displays on or in proximity to the electroanatomical map on the display.

Each layer 202a-202e (for form 202), 204a, 204b (for form 204), 206a, 206b (for form 206), 208a-208c (for form 208) is represented by and displays with an icon 202ax-202ex, 204ax, 204bx, 206ax, 206bx, 208ax, 208bx, 208cx. The icons 202ax-202ex, 204ax, 204bx, 206ax, 206bx, 208ax, 208bx, 208cx are also represented as tool tips 202ax-202ex, 204ax, 204bx, 206ax, 206bx, 208ax, 208bx, 208cx, for example, displayed in a box 320 on the screen display 300, shown for example, in FIGS. 3B-1 and 3B-2.

The icons 202ax-202ex, 204ax, 204bx, 206ax, 206bx, 208ax, 208bx, 208cx, are activated, by mouse clicks and the like, such that once activated, the associated layer is either shown or hidden, depending on the display status of the requisite layer 202a-202e (for form 202), 204a, 204b (for form 204), 206a, 206b (for form 206), 208a-208c (for form 208), prior to the mouse click/activation. In the insert 330, there is an additional icon 324 that when activated, by a mouse click or other activation, shows/hides all of the layers 202a-202e (for form 202), 204a, 204b (for form 204), 206a, 206b (for form 206), 208a-208c (for form 208), based on the display status of all of the layers prior to the activation of the icon 324. The icons 202ax-202ex, 204ax, 204bx, 206ax, 206bx, 208ax, 208bx, 208cx, 324, remain displayed in the box 320 (on an electroanatomical map 300 presented on the display 106), providing the user 108 visible and easy access to them and their representative layer.

Each layer 202a-202e (for form 202), 204a, 204b (for form 204), 206a, 206b (for form 206), 208a-208c (for form 208) also includes an activatable location (e.g., button) 222, that when activated, expands or collapses the layer based on the display status of the layer (collapsed or expanded) prior to the activation. Each layer 202a-202e (for form 202), 204a, 204b (for form 204), 206a, 206b (for form 206), 208a-208c (for form 208) includes its settings that can be set in advance, even if the layer itself is currently hidden from the electro anatomical map 300.

For example, in FIGS. 2A and 2B-1, on the form 200, the layer "Point marks" 202d is shown in a collapsed position, with the button 222 shown as a downward pointing arrow. When the button 222 is activated, the layer "Point marks" 202d expands, with the expanded layer shown on the expanded form (subform) 202' as shown, for example, in FIG. 2B-2.

In addition, the button 222 for each layer 202a-202e (for form 202), 204a, 204b (for form 204), 206a, 206b (for form 206), 208a-208c (for form 208) can be activated, i.e., right clicked (on a mouse or the like), to easily lead the operator 107 to the preferences for the layer(s) (for example, with the preference options "On Point" or "Projected"), related to the respective layer.

The form 200 is linked to an electroanatomical map 300, via a GUI element, such as a button 310, which maps to the form 200. When the button 310 is activated on the electroanatomical map 300 as presented on the displays 106a, 106b, as shown, for example, in FIGS. 3A, 3B-1 and 4, the form 200, for example, is pulled from the completed forms storage 124, and transmitted to the respective display 106a, 106b, to present (e.g., pinned) on or proximate to the electroanatomical map 300 (e.g., associated with the form 200), on the displays 106a, 106b.

Figure 5:
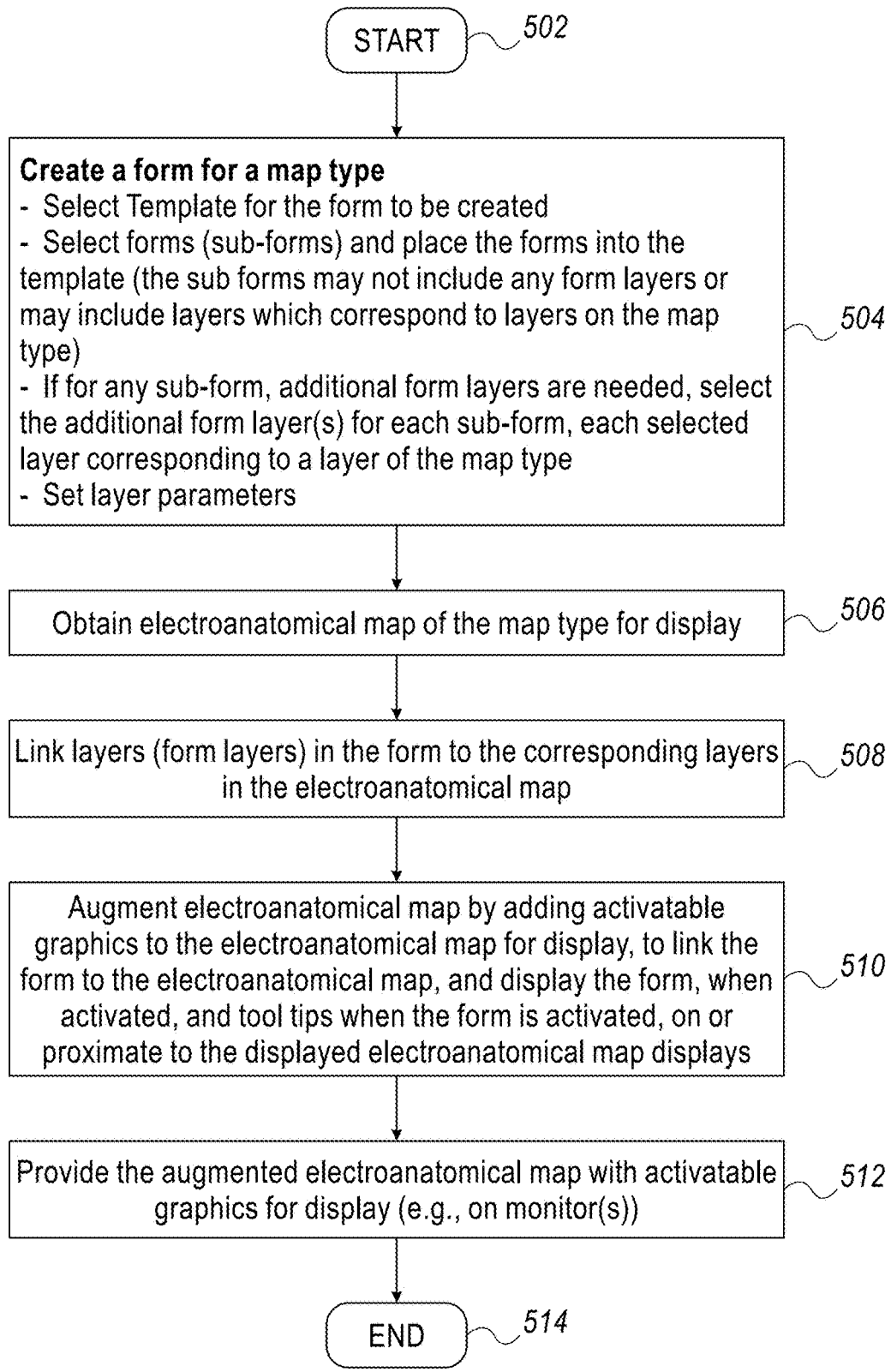
FIG. 5 is a flow diagram of an example process for creating the form of FIG. 2A, and displaying the form in FIG. 4, in accordance with the present disclosure.

Attention is now directed to FIG. 5, which shows a flow diagram detailing computer-implemented processes in accordance with examples of the disclosed subject matter. Reference is also made to elements shown in FIGS. 1, 2A, 2B-1, 2B-2, 3A, 3B-1, 3B-2 and 4. The process and sub-processes of FIG. 5 are computerized processes performed by the system 104', for example, by the main server 104. The aforementioned processes and sub-processes can be, for example, performed manually, automatically, or a combination thereof, and, for example, in real time.

The process begins at START block 502, where an electroanatomical imaging system 102 is known to the system 104' including its capabilities to produce various types of electroanatomical maps, such as maps used with CARTO® Systems. For example, the electroanatomical imaging system 102 may be a CARTO® system, or CARTO® 3 System, from Biosense Webster.

The process moves to block 504 where for a map type of the electroanatomical imaging system 102, a form is created. The process (subprocess) of creating a form 200, includes the user selecting a template for the form for the map type, for example, from the form templates module 118. The map type is for example, electroanatomical maps, including CARTO® maps. Subforms 202, 204, 206, 208, which are consolidated in the form 200 (form template) and form the arts or components of the form 200, usable with the map type, are predetermined for the template and/or selected, or combinations thereof, for example, from the forms/menus database 120, and arranged in the form template, by the user 107. The subforms typically include layers for the map type. However, if there are not any layers, or the user would like to add layers to any of the subforms, layers may be selected from the layers database 122, and added to the respective subform. With all the layers set in the form 200, layer parameters may be set by the user 108.

The process moves to block 506, where an electroanatomical map of the map type corresponding to that for the form 200, which was created, is obtained, from the electroanatomical imaging system 102. This map is provided for display (presentation on the display 106).

At block 508, the layers in the form 200 are linked to the layers in the electroanatomical map, allowing the form to operate in conjunction with the displayed electroanatomical map.

Moving to block 510, the electroanatomical map is augmented, as activatable graphics, from the module 116, which link the electroanatomical map to the form 200 are added to the electroanatomical map. The activatable graphics include a button 310 which activates the form 200 and causes the form 200 to display on the displayed electroanatomical map, or proximate thereto, on the respective display 106a, 106b.

The activatable graphics also include tool tips 320, which correspond to, or are icons, which display on or proximate to the displayed electroanatomical map. These tool tips 320 correspond to the icons of the various layers of the form (which correspond to the layers of the electroanatomical map). When the electroanatomical map displays on the respective display 106a, 106b, and the button 310 is activated, the form 200 displays on, or proximate to, the displayed electroanatomical map. Similarly, when a tool tip 320 is activated, for example while the form 200 displays, the activated tool tip 320 hides or shows the level associated with the corresponding icon.

The process moves to block 512, where the now augmented, or otherwise modified electroanatomical map with the activatable graphics, is provided to the respective display 106a, 106b, so as to be presented thereon.

The process moves to block 514, where it ends. The process is repeatable for as long as desired.

Figure 6:
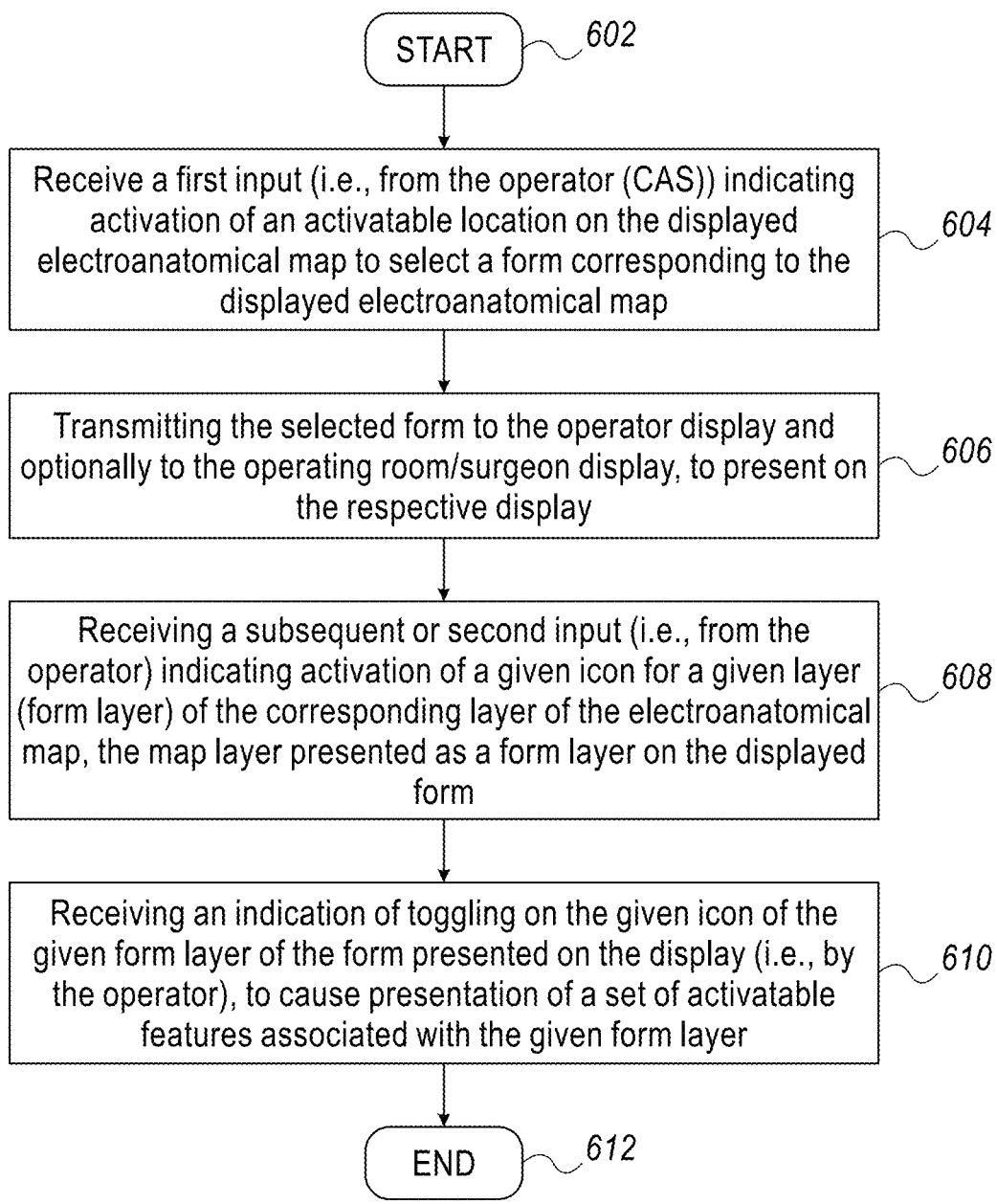
FIG. 6 is a flow diagram of an example operating process for using the single form, in accordance with the present disclosure.

Attention is now directed to FIG. 6, which shows a flow diagram detailing a process for operating the system 104' and the forms created by the system 104'. Reference is also made to elements shown in FIGS. 1, 2A, 2B-1, 2B-2, 3A, 3B-1, 3B-2 and 4. The process and sub-processes of FIG. 6 include computerized processes performed by the system 104', for example, by the main server 104. The aforementioned processes and sub-processes can be, for example, performed manually, automatically, or a combination thereof, and, for example, in real time.

This process begins at a START block 602. At the start block 602, for example, a form, i.e., form 200, has been created, with the subforms 202, 204, 2067, 208, which comprise the form including the various layers, each layer 202a-202e, 204a-204b, 206a-206b and 208a-208c, including a left side icon 202ax-202ex, 204ax, 204bx, 206ax, 206bx, 208ax, 208bx, 208cx, and a right side button 222, for expanding and collapsing the respective layer.

Moving to block 604, an input, or first input, is received by the system 104' from the operator 107, who has activated an activatable location, for example, button 310 (FIG. 3A) on the electroanatomical map 300 (FIG. 3A), to select the form 200. At block 606, the form 200 is transmitted, for example, by the system 104', to the respective displays 106a, 106b, and presents on the displays 106a, 106b, fully or partially on the electroanatomical map 300, or proximate thereto, as shown, for example, in FIG. 4. Alternately, the form 200 may present only on the display 106a of the operator 107, so that the surgeon 108 has a clear and full view of the electroanatomical map 300. The form 200 includes subforms and the various layers for each subform. Each layer includes an icon and a expand/collapse button, as detailed for the form 200 above.

Moving to block 608, a subsequent or second input is then received by the system 104' from the operator 107 from a location corresponding to a given icon of a given layer. The process moves to block 610, where the system 104' receives an indication of toggling (e.g., by the operator 107) on the icon, resulting in the presentation of a set of features for the given icon on the respective displays 106a, 106b, or optionally, only the display 106a of the operator 107. This allows the operator to set the various features associated with the given layer.

The process moves to block 612, where it ends. The process can be repeated for as long as desired.

EXAMPLES

Example 1

A method for managing an electroanatomical map (300), the method comprising: a) providing an electroanatomical map (300) of a body organ for a display (106a, 106b), the electroanatomical map (300) comprising: a plurality of map layers (202a-202d, 204a, 204b, 206a, 206b, 208a-208c); and, an activatable location; b) providing a form (200) comprising a plurality of subforms (202, 204, 206, 208), each subform (202, 204, 206, 208) comprising one or more form layers (202a-202d, 204a, 204b, 206a, 206b, 208a-208c), each of the form layers (202a-202d, 204a, 204b, 206a, 206b, 208a-208c) corresponding to a map layer of the plurality of map layers of the electroanatomical map (300), each of the form layers of each subform comprising information of the current state each corresponding layer of the electroanatomical map; and, c) activating the activatable location (310) of the electroanatomical map (300) to present the form (200) in association with the electroanatomical map (300) on the display.

Example 2

The method according to Example 1, additionally comprising: linking the activatable location (310) to the form (200).

Example 3

The method according to any of Example 1 or Example 2, wherein each of the form layers (202a-202d, 204a, 204b, 206a, 206b, 208a-208c), includes an activatable icon (202ax, 202bx, 202cx, 202dx, 204ax, 204bx, 206ax, 206bx, 208ax, 208bx, 208cx), which when activated, toggles presentation of its corresponding map layer.

Example 4

The method according to any one of Example 1 to Example 3, wherein the activatable location (310) includes an activatable button (310) which toggles presentation of the form (200) on the electroanatomical map (3000.

Example 5

The method according to any one of Example 1 to Example 4, wherein the providing a form (200) comprises the form (200) including one or more predetermined subforms (202, 204, 206, 208) of the plurality of subforms placed in the form.

Example 6

The method according to any one of Example 1 to Example 5, wherein the providing the form (200) includes the user selecting one or more subforms (202, 204, 206, 208) of the plurality of subforms (202, 204, 206, 208) for placement in the form (200).

Example 7

The method according to any one of Example 1 to Example 6, wherein each form layer (202a-202d, 204a, 204b, 206a, 206b, 208a-208c) for each subform (202, 204, 206, 208) is selected by the user.

Example 8

The method according to any one of Example 1 to Example 7, wherein the user positions each subform (202, 204, 206, 208) in the form (200).

Example 9

The method according to any one of Example 1 to Example 8, wherein the subforms (202, 204, 206, 208) are selected from the group of: coherency forms (204), tag subforms (202), and electroanatomical map marking forms (208).

Example 10

The method according to any one of Example 1 to Example 9, wherein the electroanatomical map (300) includes a CARTO® map.

Example 11

The method according to any one of Example 1 to Example 10, wherein the form (200) comprises a graphical user interface (GUI) (310).

Example 12

The method according to any one of Example 1 to Example 11, wherein the body organ comprises a heart.

Example 13

A system for creating electronic management media for managing an electroanatomical map (300) comprising: storage media (104) for storing computer components; and, at least one processor (112) for executing the computer components comprising: a first computer component for receiving an electroanatomical map (300) of a body organ for a display, the electroanatomical map (300) comprising a plurality of map layers; a second computer component (120) for providing a form comprising a plurality of subforms (202, 204, 206, 208), each subform (202, 204, 206, 208) comprising one or more form layers (202a-202d, 204a, 204b, 206a, 206b, 208a-208c), each of the form layers (202a-202d, 204a, 204b, 206a, 206b, 208a-208c) corresponding to a map layer of the plurality of map layers of the electroanatomical map (300), each of the form layers (202a-202d, 204a, 204b, 206a, 206b, 208a-208c) of each subform (202, 204, 206, 208) comprising information of the current state each corresponding layer of the electroanatomical map (300); and, a third computer component (116) for providing an activatable location (310) to the electroanatomical map (300) to link the form (200) to the electroanatomical map (300).

Example 14

The system according to Example 13, wherein the activatable location (310) of the electroanatomical map (300), being presented on a display (106a, 106b), when activated, causes presentation of the form (200) on or proximate to the electroanatomical map (300) on the display (106a, 106b).

Example 15

The system according to any one of Example 13 or Example 14, wherein the system additionally comprises: at least one display (106a, 106b) in communication with the at least one processor (112).

Example 16

A method for managing an electroanatomical map (300) comprising: obtaining an electroanatomical map (300) of a body organ for a display, the electroanatomical map (300) comprising a plurality of map layers; providing a form (200) comprising a plurality of subforms (202, 204, 206, 208), each subform (202, 204, 206, 208) comprising one or more form layers (202a-202d, 204a, 204b, 206a, 206b, 208a-208c), each of the form layers (202a-202d, 204a, 204b, 206a, 206b, 208a-208c) corresponding to a map layer of the plurality of map layers of the electroanatomical map (300), each of the form layers of each subform comprising information of the current state each corresponding layer of the electroanatomical map; and, providing an activatable location (310) to the electroanatomical map (300) to link the form (200) to the electroanatomical map (300).

Example 17

The method according to Example 16, additionally comprising: when the electroanatomical map (300) is presented on a display (106a, 106b), activating the activatable location (310) of the electroanatomical map (300) to present the form (200) in association with the electroanatomical map (300) on the display (106a, 106b).

Example 18

The method according to any one of Example 16 or Example 17, wherein the form (200) presents at a location on the display (106a, 106b), on or proximate to the electroanatomical map (300).

Although the examples described herein mainly address computer systems and monitors associated with a CARTO® and other medical procedures, the methods and systems described herein can also be used in other applications, such as in multiple clinical workflows, which require diagnostic imaging, such as computerized tomography (CT), Magnetic Resonance Imaging (MRI), ultrasound imaging, and other three-dimensional medical imaging.

The aforementioned disclosed subject matter may, for example, also be in the form of a computer software product. The product comprises, for example, a tangible non-transitory computer-readable medium in which program instructions are stored, which instructions, when read by a processor, cause the processor to selectively clone computer display monitors from a first one or more monitors, associated with an operator, to a second one or more monitors, associated with a surgeon.

It will thus be appreciated that the examples described above do not limit the present disclosure to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for managing an electroanatomical map, the method comprising:
   providing an electroanatomical map of a heart on a display, the electroanatomical map comprising a plurality of map layers; and
   providing a form comprising a plurality of subforms, each subform comprising one or more form layers, each of the form layers corresponding to a map layer of the plurality of map layers of the electroanatomical map, each of the form layers of each subform comprising information of a current state of the corresponding map layer; and
   providing an activatable location at or proximate to the electroanatomical map, wherein a user activating the activatable location presents the form on the display, the form allowing the user to manage the plurality of map layers from a single user interface;
   wherein each form layer is associated with an activatable icon, the activatable icon having a graphic appearance that corresponds to the corresponding map layer, and when the activatable icon is activated, toggles presentation of the corresponding map layer on the electroanatomical map; and
   wherein each form layer includes settings that can be configured in advance, regardless of whether the corresponding map layer is currently displayed on the electroanatomical map; and
   wherein the form is further configured to be minimized to display only the activatable icons corresponding to the form layers.

2. The method of claim 1, additionally comprising: linking the activatable location to the form.

3. The method of claim 1, wherein the activatable location includes an activatable button which toggles presentation of the form on the electroanatomical map.

4. The method of claim 1, wherein the providing a form comprises the form including one or more predetermined subforms of the plurality of subforms placed in the form.

5. The method of claim 1, wherein the providing the form includes the user selecting one or more subforms of the plurality of subforms for placement in the form.

6. The method of claim 1, wherein each form layer for each subform is selected by the user.

7. The method of claim 6, wherein the user positions each subform in the form.

8. The method of claim 1, wherein the subforms are selected from the group of: coherency forms, tag subforms, and electroanatomical map marking forms.

9. The method of claim 1, wherein the electroanatomical map includes an electroanatomical map.

10. The method of claim 1, wherein the form comprises a graphical user interface (GUI).

11. A system for managing an electroanatomical map of a body organ, the system comprising:
    a display configured to present an electroanatomical map comprising a plurality of map layers, each map layer representing a distinct aspect of the organ;
    a single form displayed on the display, the form comprising a plurality of subforms, each subform comprising one or more form layers, each form layer corresponding to a specific map layer of the plurality of map layers;
    an activatable button located on the electroanatomical map, wherein activating the button causes the form to be presented on the display adjacent to the electroanatomical map;
    wherein each form layer includes an activatable icon that has a graphic appearance that corresponds to the corresponding map layer and that toggles the display of the corresponding map layer on the electroanatomical map; and
    wherein the form is configured to allow the operator to set and save preferences for each form layer, independent of the display status of the corresponding map layer on the electroanatomical map; and
    wherein the form is further configured to be minimized to display only the activatable icons corresponding to the form layers.

12. The system of claim 11, wherein the form layers are grouped into collapsible sections within the form, each section corresponding to a specific type of map layer.

13. The system of claim 11, wherein the preferences for each form layer include settings related to display parameters and visual indicators for the corresponding map layer.

14. The system of claim 11, wherein each subform comprises a dedicated activatable button that expands or collapses the form layers within the subform.

15. The system of claim 11, further comprising a storage module configured to save customized configurations of the form and its subforms for future use.

16. The system of claim 11, wherein the electroanatomical map includes at least one of local activation times (LATs), velocity vectors, and ablation tags as part of the plurality of map layers.

17. The system of claim 11, wherein the form is pinned to a specific location on the display adjacent to the electroanatomical map to maintain visibility of the map during adjustments.

* * * * *